Jan. 19, 1943.   P. PAVLOFF ET AL   2,308,893
ANTILANDING DEVICE FOR PIGEONS AND OTHER BIRDS
Filed Nov. 20, 1940   2 Sheets-Sheet 2
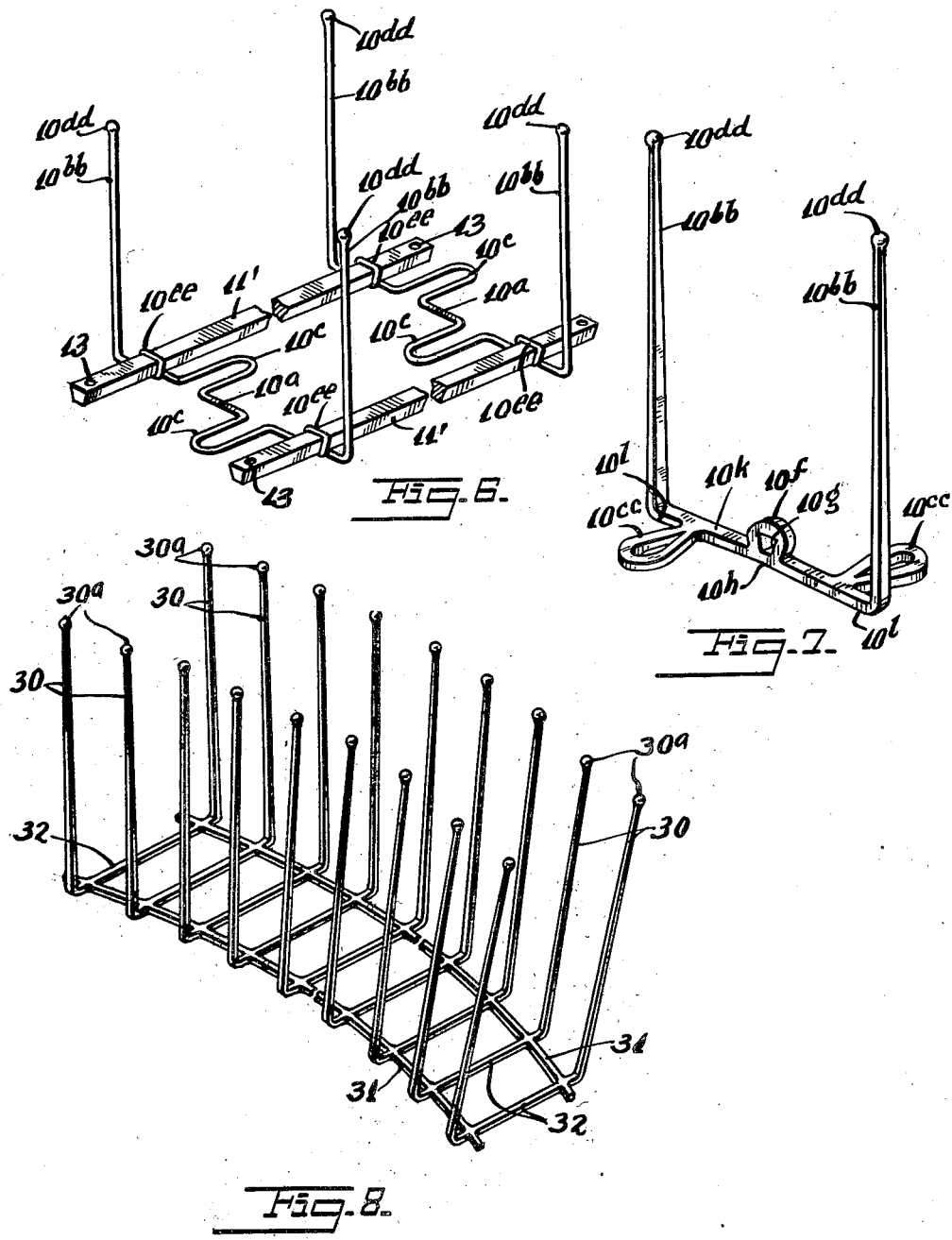
INVENTORS
Peter Pavloff
BY George Hamilton
ATTORNEY Patented Jan. 19, 1943

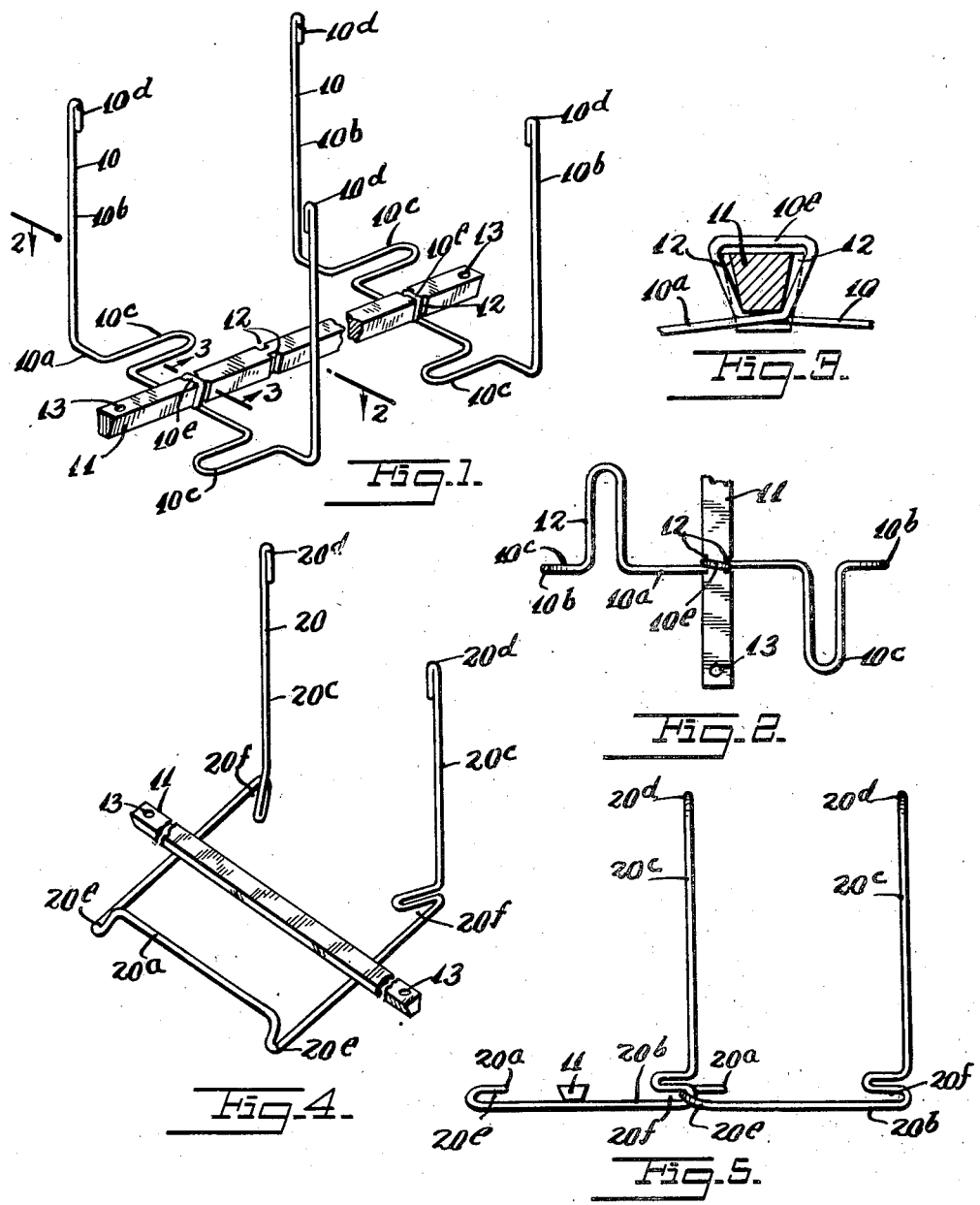

2,308,893

UNITED STATES PATENT OFFICE 2,308,893

ANTILANDING DEVICE FOR PIGEONS AND OTHER BIRDS

Peter Pavloff and George Hamilton, New York, N. Y.

Application November 20, 1940, Serial No. 366,338

3 Claims. (Cl. 20—1)

This invention relates to an anti-landing device for pigeons, and other birds.

More specifically, the invention proposes the construction of an anti-landing device for pigeons and other birds characterized by a series of formed members for resting upon a roof, ledge or other place and having a plurality of vertically extended finger portions arranged in close proximity to each other and in a manner to prevent birds from landing on the surface of the object to which the device has been applied.

Still further it is proposed to characterize the series of formed members by base portions for resting upon the surface of the roof, ledge or other place and which are adapted to be connected fixedly together in spaced relation to each other in a manner to permit the series of formed members to be mounted as a unit on the roof, ledge or other place.

In one form of the invention it is proposed to characterize the said means by a longitudinal bar having a plurality of spaced cutouts formed in the sides thereof and which are adapted to be engaged by circular loop portions formed centrally of the base portions in a manner to lock each of the formed members in position thereon.

Another object of this invention is the provision of a still further means characterized by interengaging portions on the formed members themselves and which are adapted to be used in a manner for connecting the formed members together as a unit.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a perspective view of the anti-landing device for pigeons and other birds constructed according to this invention.

Fig. 2 is a sectional plan view looking in the direction of the line 2—2 of Fig. 1.

Fig. 3 is an enlarged vertical sectional view taken on the line 3—3 of Fig. 1.

Fig. 4 is a perspective view of the anti-landing device constructed according to a modification of the invention.

Fig. 5 is an elevational view of a pair of anti-landing devices as shown in Fig. 4 connected together.

Fig. 6 is another perspective view similar to Fig. 1 but illustrating a further modification of the invention.

Fig. 7 is a perspective view illustrating a still further modification of the invention.

Fig. 8 is a perspective view of a plurality of anti-landing devices joined in one unit.

The anti-landing device for pigeons and other birds, according to this invention, comprises a series of formed members 10 each of which has a base portion 10$^a$ characterized by a transverse portion which continues at its ends into vertically extending finger portions 10$^b$. The base portion 10$^a$ is formed with projecting loop portions 10$^c$ one of which extends forwards and the other of which extends rearwards in a manner to retain these base portions in a position in which the fingers 10$^b$ will extend vertically and to prevent twisting thereof. The upper ends of the vertically extended finger portions are bent downwards forming a smooth rounded top end 10$^d$ upon the vertical finger portions for preventing birds coming in contact therewith from being hurt.

A means is provided for connecting the base portions 10$^a$ of each of the formed members 10 fixedly together so that the series of formed members may be mounted as a unit upon the roof, ledge or other place. This means comprises a longitudinal metallic or composition bar 11 which is provided with aligned pairs of spaced cutouts 12 on opposite sides thereof. The base portions 10$^a$ of the wire members 10 are formed with loop portions 10$^e$ which are adapted to engage completely around the bar 11 and into the cutouts 12 for holding the formed members at spaced positions along the length thereof. It is possible to shift the position of the formed members relative to the bar 11 or completely remove them therefrom by urging the projecting loop portions 10$^c$ together to increase the operative size of the loop portions 10$^e$ to disengage the same from the cutouts 12 to be moved along the length of the bar 11. The ends of the bar 11 are provided with openings 13 extended vertically completely therethrough. Screws, not shown on the drawings, are adapted to be passed through these openings 13 for fixedly attaching the bar to the roof, ledge or other place.

The operation of this form of the invention is as follows:

Any desired number of formed members 10 are engaged upon the bar 11 so that the fingers 10$^b$ thereof extend vertically upwards. After the desired number of formed members have been engaged in position upon the bar, the bar is securely attached to a roof, ledge or other place by engaging screws through the openings 13 and into the roof, ledge or other place so that the fingers will extend vertically upwards therefrom to be contacted by a bird attempting to land thereon and prevent the bird from so doing.

According to the modification of the invention shown in Figs. 4 and 5 an anti-landing device for pigeons and other birds is shown which is characterized by a series of formed members 20 each of which has a base portion 20ᵃ which continues at its ends into a forwardly extending pair of side portions 20ᵇ which are adapted to rest upon a roof, ledge or other place. The forward ends of the side portions 20ᵇ continue into vertically extended finger portions 20ᶜ having their top ends doubled upon themselves forming rounded top portions 20ᵈ upon the finger portions 20ᶜ and preventing the same from injuring a bird coming in contact therewith.

These formed members 20 are made with integral means for connecting a plurality of such members together in series as a unit. This means comprises receiving sockets 20ᵉ formed at the junction of the base portions 20ᵃ with the side portions 20ᵇ. Complementary receiving sockets 20ᶠ are formed at the junction of the side portions 20ᵇ with the vertically extending finger portions 20ᶜ. In connecting these formed members 20 together the finger portions 20ᶜ of one formed member are adapted to be passed upwards through the receiving sockets 20ᵉ of the other formed member 20 to bring the receiving sockets 20ᵉ of the first formed member into engagement with the complementary receiving socket members 20ᶠ of the second formed member. The engagement of the socket members 20ᵉ and 20ᶠ is shown in Fig. 5.

A cross bar 21 may be used for securing one of the formed members in position upon the roof, ledge or other places, and the other formed members may be engaged to the formed member which is securely held in position.

By means of this arrangement any one of the formed members may be removed from the series of formed members when it becomes necessary to replace same without removing the holding bar 21 and completely disengaging the entire series of formed members.

In Fig. 6 two bars 11' of keystone shape cross section are illustrated which are adapted to engage corresponding loop portions 10ᵉᵉ formed in the base portion 10ᵃᵃ, adjacent the fingers 10ᵇᵇ. These fingers are shown with rounded ends 10ᵈᵈ. In other respects, this form of the invention is similar to the form illustrated in Fig. 1 of the drawings.

In Fig. 7 the device is shown as made of cast material with vertical fingers 10ᵇᵇ, rounded end portions 10ᵈᵈ, horizontal loop portions 10ᶜᶜ and a vertical loop portion 10ᶠ. This latter loop portion is formed with a keystone shaped opening 10ᵍ adapted to be engaged by the keystone shaped bar 11. The bottom of the center portion 10ʰ of the base member 10ʲ is preferably somewhat higher than the ends 10ⁱ of the base portion 10ᵏ so that when the bar 11 is secured to a portion of the building, the anti-landing device is firmly held in position.

In Fig. 8 the fingers 30 are illustrated as integral parts of the side members 31 and the connecting cross members 32 and are formed with rounded ends 32ᵃ to prevent injury of pigeons or other birds.

It is to be understood that this device may be made of composition or any other suitable springy or flexible material which will not injure the pigeons and which is not poisonous.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:

1. In an anti-landing device having a series of formed members of resilient material having base portions for resting on a horizontal surface and upwardly extending fingers continuing from the ends of said base portions, a bar for engagement on a horizontal surface and formed at spaced points on opposite sides with aligned cutouts, and loops formed on said base portions intermediate of their ends and encircling said bar at said cutouts for locking said formed members at spaced positions along the length of said bar, whereby said base portions may be gripped on opposite sides of said bar to be urged together for spreading said loops to disengage said cutouts to free said formed members to be moved along the length of said bar.

2. In an anti-landing device having a series of formed members of resilient material having base portions for resting on a horizontal surface and upwardly extending fingers continuing from the ends of said base portions, a bar for engagement on a horizontal surface and formed at spaced points on opposite sides with aligned cutouts, and loops formed on said base portions intermediate to their ends and encircling said bar at said cutouts for locking said formed members at spaced positions along the length of said bar, whereby said base portions may be gripped on opposite sides of said bar to be urged together for spreading said loops to disengage said cutouts to free said formed members to be moved along the length of said bar, and means for securing said bar to said horizontal surface to prevent said loop portions from being spread or tampered with by unauthorized persons.

3. In an anti-landing device having a series of formed members of resilient material having base portions for resting on a horizontal surface and upwardly extending fingers continuing from the ends of said base portions, a bar for engagement on a horizontal surface and formed at spaced points on opposite sides with aligned cutouts, and loops formed on said base portions intermediate of their ends and encircling said bar at said cutouts for locking said formed members at spaced positions along the length of said bar, whereby said base portions may be gripped on opposite sides of said bar to be urged together for spreading said loops to disengage said cutouts to free said formed members to be moved along the length of said bar, and means for securing said bar to said horizontal surface to prevent said loop portions from being spread or tampered with by unauthorized persons, comprising, screws passed through openings formed in said bar and threadedly engaged into said horizontal surface.

PETER PAVLOFF.
GEORGE HAMILTON.